United States Patent
Waldspurger

(10) Patent No.: US 9,454,478 B2
(45) Date of Patent: *Sep. 27, 2016

(54) SYSTEM AND METHOD FOR CONTROLLING RESOURCE REVOCATION IN A MULTI-GUEST COMPUTER SYSTEM

(75) Inventor: Carl A. Waldspurger, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/430,318

(22) Filed: Mar. 26, 2012

(65) Prior Publication Data

US 2012/0246320 A1    Sep. 27, 2012

Related U.S. Application Data

(63) Continuation of application No. 12/236,081, filed on Sep. 23, 2008, now Pat. No. 8,145,763, which is a continuation of application No. 09/668,666, filed on Sep. 22, 2000, now Pat. No. 7,433,951.

(51) Int. Cl.

| | |
|---|---|
| *G06F 15/173* | (2006.01) |
| *G06F 12/02* | (2006.01) |
| *H04L 29/08* | (2006.01) |
| *H04L 29/06* | (2006.01) |
| *G06F 9/50* | (2006.01) |

(52) U.S. Cl.
CPC ......... *G06F 12/0284* (2013.01); *G06F 9/5016* (2013.01); *G06F 9/5077* (2013.01); *H04L 29/06* (2013.01); *H04L 29/08144* (2013.01); *G06F 2209/5014* (2013.01)

(58) Field of Classification Search
CPC ...................... H04L 29/08144; H04L 29/06
USPC ...................... 709/224–226; 718/102–104
See application file for complete search history.

(56) References Cited

U.S. PATENT DOCUMENTS

| | | | |
|---|---|---|---|
| 5,170,340 A * | 12/1992 | Prokop et al. ................. | 700/23 |
| 6,061,504 A | 5/2000 | Tzelnic et al. | |
| 6,070,173 A * | 5/2000 | Huber et al. | |
| 6,101,558 A | 8/2000 | Utsunomiya et al. | |
| 6,134,596 A | 10/2000 | Bolosky et al. | |
| 6,185,659 B1 * | 2/2001 | Milillo et al. ................ | 711/137 |
| 6,237,024 B1 * | 5/2001 | Wollrath et al. .............. | 709/203 |

(Continued)

OTHER PUBLICATIONS

Govil et al., Cellular Disco:resource management using virtual clusters on shared-memory multiprocessors, Dec. 1999.*

(Continued)

*Primary Examiner* — Chris Parry
*Assistant Examiner* — Weiwei Stiltner

(57) ABSTRACT

At least one guest system, for example, a virtual machine, is connected to a host system, which includes a system resource such as system machine memory. Each guest system includes a guest operating system (OS). A resource requesting mechanism, preferably a driver, is installed within each guest OS and communicates with a resource scheduler included within the host system. If the host system needs any one the guest systems to relinquish some of the system resource it currently is allocated, then the resource scheduler instructs the driver within that guest system's OS to reserve more of the resource, using the guest OS's own, native resource allocation mechanisms. The driver thus frees this resource for use by the host, since the driver does not itself actually need the requested amount of the resource.

20 Claims, 1 Drawing Sheet

(56) References Cited

U.S. PATENT DOCUMENTS

| | | | |
|---|---|---|---|
| 6,247,081 B1 | 6/2001 | Murata | |
| 6,393,539 B1 * | 5/2002 | Nguyen et al. | 711/164 |
| 6,473,842 B1 * | 10/2002 | Tsutsumi | 711/159 |
| 6,725,456 B1 * | 4/2004 | Bruno et al. | 718/102 |
| 6,728,746 B1 * | 4/2004 | Murase et al. | 718/1 |
| 6,732,289 B1 * | 5/2004 | Talagala et al. | 714/6.3 |
| 7,159,223 B1 * | 1/2007 | Comeau | 719/310 |
| 7,433,951 B1 | 10/2008 | Waldspurger | |

OTHER PUBLICATIONS

Steven M. Hand; "Self-paging in the Nenesis Operating System"; Proceedings of the Third Symposium on Operating Systems Design an Implementation (OSDI '99); Feb. 1999; pp. 73-86.

* cited by examiner

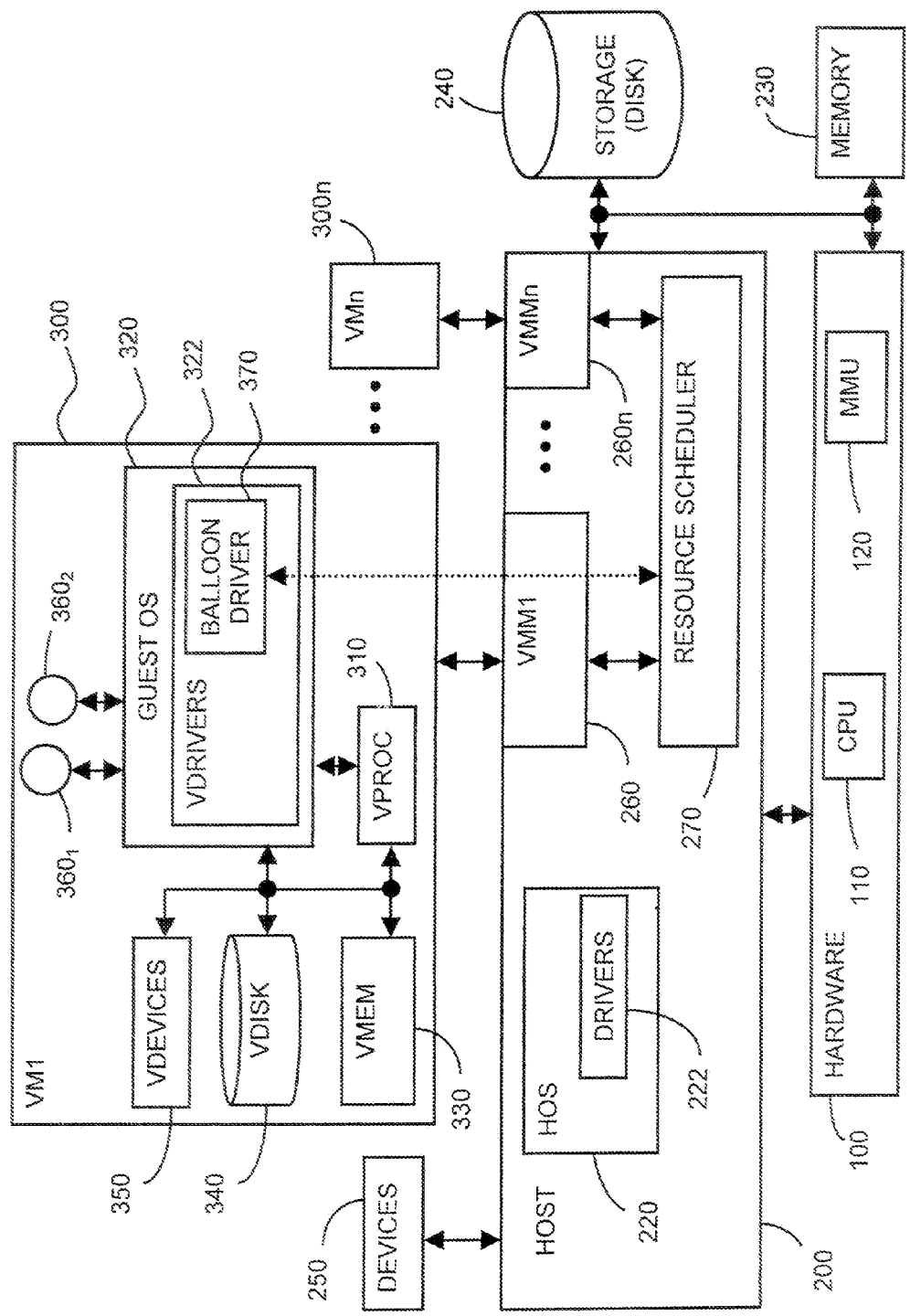

SYSTEM AND METHOD FOR CONTROLLING RESOURCE REVOCATION IN A MULTI-GUEST COMPUTER SYSTEM

CROSS-REFERENCE TO RELATED APPLICATION(S)

This application is a continuation of U.S. patent application Ser. No. 12/236,081, filed Sep. 23, 2008, which is a continuation of U.S. patent application Ser. No. 09/668,666, filed Sep. 22, 2000 (now U.S. Pat. No. 7,433,951).

BACKGROUND OF THE INVENTION

1. Field of the Invention

This invention relates very broadly to computer operating systems, and in particular to a method for allocating at least one system resource that is shared among two or more guest computer systems, which are connected to a host computer system that contains the shared resource. The invention is particularly applicable where the guest systems are virtual machines communicating with an underlying physical computer architecture via a virtual machine monitor and/or similar virtual or real operating system.

2. Description of the Related Art

Every modern computer system includes some I/O or peripheral device, as well as applications. A keyboard, a mouse, a graphics or sound card, a printer, and a disk drive are all examples of such devices, and there are at least thousands of different kinds of applications. Each such device or application requires some system resource, such as processor (CPU) time, I/O bandwidth on the various data buses, and physical memory space.

As is well known, every general-purpose computer also includes an operating system (OS) not only as a common, standardized software platform on which other programs (applications) can run, but also to manage the various system resources, to ensure that different applications do not interfere with each other, to provide security, and to keep track of files and directories used to organize the memory resource, just to name a few of the tasks handled by the OS. Managing and allocating the resources of the volatile and non-volatile storage, such as the system RAM and the hard disk(s), is central to any operating system. Accordingly, software modules to provide such scheduling and related resource management are usually included in the "kernel" of the OS.

Except in very specially designed systems, each device such as a printer, a disk drive, a mouse, a sound card, etc., must be defined within the OS by a software module known as a "device driver," or, simply a "driver." A driver typically handles and/or forwards interrupts generated by the respective device, and it also operates as a translator between the device and programs that use the device: Each device typically has its own set of specialized commands that the OS can interpret and carry out, whereas most programs access the device using generic commands. Thanks to this arrangement, it is possible to load many different programs (for example, different word processing programs) that share the same printer, although the printer driver itself will be specific to a particular operating system (such as Unix) or class of operating systems (such the Windows 95, 98, NT and 2000 series).

Many drivers for standardized devices such as a keyboard typically come with the OS. For other devices, one must load a new driver when the device is connected to the computer. For example, printers usually come with a floppy disk, CD ROM (or Internet link for downloading) that, when loaded into the proper drive, automatically installs the needed driver into the OS.

As will become clear from the discussion of the invention below, one particularly important feature of an OS is that it allocates memory resources to the various devices and running applications. For example, a graphics-intensive application will typically require much more available memory than the keyboard. The amount of memory needed by each device is passed by the driver to the OS as a parameter. This requirement for memory (including disk space) may be constant, such as for a keyboard, or it may change during the operation of the device. For example, if a device needs more memory, its driver will issue a corresponding request to the OS, which then handles the request. If enough system memory is available, then the OS will allocate the requested space. In cases where not enough system memory available, the OS will then either swap other memory pages out to the much slower disk and return the newly-freed memory to satisfy the request, or it will return an error if swapping out is insufficient or impossible. In the common multitasking environment, several different applications may be functionally connected to the OS, each having different and often conflicting needs for various system resources. As a simple example, two different programs might issue requests for data transfer from a hard disk very closely together in time. Similarly, two different programs may need to transfer so much data via a modem or other I/O device that their requests exceed the bandwidth of the device. The OS must then schedule the two competing requests for use of the resource (memory and I/O bandwidth, respectively) according to some predetermined administrative policy, such as not exceeding a maximum time of interruption of execution of either program.

The problem of competition for a system resource such as memory may become particularly acute in systems where many "guest" computer systems (physical or virtual) are connected to a central system that contains and manages the actual, physical devices (including memory) and thus acts as a "host" system. As the number of guest systems increases, so too does the probability and frequency of conflicting demands for the common resource(s) of the host.

The concept of a "host" system includes both host hardware and host software. These two aspects of the host system are explained in greater detail below, but in order to avoid possible confusion of terminology, is summarized as follows: The host hardware, as the name implies, will include one or more processors and the various physical devices. The host software will typically include some form of host operating system, as well as other conventional system software as needed.

For example, in the context of virtual machine technology, several virtual machines (VM's) often run via respective virtual machine monitors (VMM's) on a common underlying hardware platform and must share physical resources. Each VM thus constitutes a guest system, and typically includes its own guest operating system. One or more applications then usually run in each guest. Among other functions, the VMM intercepts and converts requests for physical resources by the VM's into corresponding requests for actual hardware resources. In some systems, the VMM itself performs the functions of an operating system and is responsible for managing all the physical system resources such as CPU time, physical memory, and I/O bandwidth. In other systems, the VMM forwards the requests to the underlying host operating system.

In either case, from the perspective of a VM, the VMM, or some other equivalent software module, is part of the host system, although it is included specifically to monitor and manage a VM. Because the VMM is completely or at least substantially transparent to the VM(s) it manages, but normally not to the host hardware and/or host OS, it is therefore referred to here as being part of the host software, along with or instead of the host OS, even if the VMM is "packaged" with its corresponding VM.

Regardless of the nature of the guest systems, machine resources must be shared in a controlled manner that prevents any guest system (such as a VM) from monopolizing resources to the exclusion of other guest systems. More generally, the system should guarantee that each guest will receive a predictable share of resources as defined by some administrative policy.

One obvious way to ensure this is simply to allocate to each guest system a fixed share of each resource. For example, in systems that have the well-known Intel x86 architecture, memory is divided into fixed-size units called "pages." Similar division of memory in fixed-size pages is found in other known modern processor architectures as well, such as MIPS, PowerPC, and Alpha, although the actual size of the pages may vary. For example, the page size in the x86 architecture is 4 Kbytes, but in the Alpha architecture it is 8 Kbytes. This invention does not require any particular page size; indeed, it does not require division of the memory into pages at all.

In a static allocation scheme, the host, via the VMM's, simply allocates to each VM a predetermined, fixed number of memory pages for its use, essentially partitioning the memory. The biggest disadvantage of this static scheme is obvious: Some VM's may be allotted more memory than they need, whereas others may be forced to use the much slower hard disk much more often than they should, just because their fixed share of the fast system memory is too small. Consequently, it is usually preferable to track each VM's need for memory (or other resource) and to allocate memory dynamically.

Dynamic management of space-shared resources generally involves some form of resource revocation. Since the availability of a system resource such as memory is essentially "zero-sum," conceptually, when one guest system is granted more space, the host (for example, a VMM, the host OS, or some other software component included in the host software) must select a "victim," which must then relinquish some of its previously allocated space. The revocation of physical memory can be decomposed into two conceptual steps. First, a memory scheduling mechanism (the "memory scheduler") must select a victim guest (such as a VM) from which to revoke memory. Second, the memory scheduler must choose the particular pages of memory to be revoked from the victim.

One disadvantage of existing dynamic resource allocation mechanisms is that the guest operating system running, for example, in each VM has much better information about which of its allocated memory pages (or analogous units of memory) contain the least time-critical data and are therefore more suitable to be swapped out to a slower storage device such as the hard disk: Guest operating systems often employ sophisticated memory management algorithms that exploit knowledge about internal system or application characteristics that is not available to the VMM. A guest OS may, moreover, even have excess pages available on its internal free list.

Another disadvantage of known dynamic resource allocation mechanisms is that they require relatively complicated and costly data structures and algorithms within the host software in order to track how much of the resource each guest (here: VM) has and needs and how best to allocate the resource among the competing guests. Increasing the efficiency of such systems requires more and more information about each guest to be incorporated and organized within the host. Of course, this not only increases the complexity of the allocation mechanism, but it also makes it relatively inflexible: If a new guest is connected to the host, then its local information, which might be quite different from that of other connected guests, must also be incorporated into whatever component of the host software that schedules resources. Moreover, guest-specific information needed to make decisions about specific pages to revoke differs not only across operating systems (for example, Linux versus Windows NT), but also across different versions ("service packs," etc.) of the same vendor's OS.

Existing virtual machine operating systems also often suffer from a problem known as "redundant paging." Redundant or "double" paging can occur due to the use of two independent levels of paging algorithms—one by the guest OS within the VM, and another in whichever host software component the guest communicates with, such as the VMM, the host operating system, or some equivalent mechanism. As a result, some pages of memory may be swapped out to disk twice, or may be read in by one level and immediately paged out by the other. Avoiding this inefficiency typically requires the implementation of a special swap file in the guest OS, which is monitored by the VMM (or equivalent mechanism in the host). The problem of double paging, and one proposed solution using a swap file, is described in "Cellular Disco: resource management using virtual clusters on shared-memory multiprocessors", Kinshuk Govil, Dan Teodosiu, Yongqiang Huang, and Mendel Rosenblum, Proceedings of the 17th ACM Symposium on Operating System Principles (SOSP '99), Dec. 12-15, 1999, pp. 154-169.

Analogizing to the field of economics, one might therefore say that the prior art relies on centralized decision-making about the allocation of the limited resource (here: fast system memory), which fails to adequately take specific "local" information into account. Moreover, centralization requires a relatively large and inflexible "bureaucracy," which, is this case, translates to various mapping tables and other data structures, as well as tracking algorithms, which leads to waste and inefficiency not only locally, but also globally.

One attempt in the prior art to decentralize the choice of which particular page to reclaim from a particular application involves a technique known as "application-level paging." This technique is described, for example, in "Self-Paging in the Nemesis Operating System," Steven M. Hand, Proceedings of the Third Symposium on Operating Systems Design and Implementation (OSDI '99), February 1999, pp. 73-86. According to this technique, the OS chooses a particular application process as the "victim," meaning that it must relinquish memory pages. The process then itself selects which of its pages to relinquish.

One disadvantage of application-level paging is that it requires an explicit interface and protocol to allow the OS and the various applications to cooperate in selecting pages to be relinquished. The page revocation mechanism in application-level paging is therefore not transparent to the OS.

Another disadvantage of application-level paging is that it presupposes that the various applications are sophisticated enough to make good decisions about which pages to relinquish. This will often not be true in many common applications. Put differently, application-level paging involves an attempt at decentralization that puts the primary responsibility for controlling page revocation at a level where the "decision-makers" are either not designed to make the decision efficiently, or are not designed to make the decision at all.

What is needed is therefore a way to quickly and efficiently allocate a system resource, in particular, memory, among several guest systems connected to a host system that is able to utilize local information about the various guest systems, that easily adapts to changes in the number of guest systems, that avoids the problem of double paging, that is essentially transparent to the guest OS, and that does so without the need for complicated, extensive centralized data structures and tracking algorithms. This invention accomplishes this.

SUMMARY OF THE INVENTION

According to the invention, a computer system includes a host system and at least one guest system. The host system includes a host operating system (OS) and at least one system resource; each guest system includes a guest OS and is operatively connected to the host system. Each guest OS has a resource request mechanism for reserving the system resource from within the respective guest OS, thereby making the resource available to the host system. In the preferred embodiment of the invention, the resource request mechanism is a driver installed within each respective guest OS.

In the most common implementation, in which the system has a plurality of guest systems, a resource scheduler is included in the host system for allocating the system resource among the guest systems. A mechanism is further included to enable the resource scheduler to communicate a respective resource quantity request to each driver. Each driver, upon sensing the respective resource quantity request, then reserves, via its corresponding guest OS, an amount of the system resource corresponding to the resource quantity request. Each guest OS includes a resource reservation mechanism that reserves specified amounts of the system resource.

The driver is operatively connected to the resource reservation mechanism and communicates the resource quantity request to the resource reservation mechanism in the guest OS. The resource reservation mechanism of each guest OS is preferably native to the guest OS, with all communication between the resource scheduler and the guest systems taking place via the respective drivers. The resource scheduler thus remains transparent to the guest systems.

In the preferred embodiment of the invention, each guest system is a virtual machine. A virtual machine monitor is then preferably included for each virtual machine and forms an interface between the resource scheduler and each respective virtual machine.

In the most common implementation of the invention, the system resource is system machine memory. The guest OS allocates and deallocates physical memory to applications and drivers loaded within and connected to the guest OS, physical memory being that portion of the system machine memory that may be reserved by any guest system. Upon an increase in the resource quantity request for a specified one of the drivers, the guest OS reserves for the specified driver a corresponding quantity of physical memory; the driver thereby makes the system machine memory corresponding to the reserved physical memory available for allocation by the host OS to other guest systems. Upon a decrease in the resource quantity request for the specified one of the drivers, the corresponding specified guest OS deallocates a corresponding quantity of physical memory, thereby reserving the system machine memory corresponding to the deallocated physical memory for use solely by the specified guest system.

The resource request mechanism may also be provided for adapting the rate at which it reserves the system resource via the guest OS to be no greater than a current maximum reservation change rate of the guest OS.

In one alternative to the preferred embodiment of the invention, resource request mechanism is a user-level application loaded in the guest system and running on the guest OS.

The system resource is preferably system memory, but the invention may also efficiently allocate other resources. For example, in systems where the host system includes a plurality of processors, the system resource can then be the plurality of processors. In this case, the resource quantity request indicates the number of the plurality of processors to be reserved by each guest system.

BRIEF DESCRIPTION OF THE DRAWINGS

FIG. 1 is a block diagram that illustrates the main hardware and software components of the invention, including the connection between a resource scheduler in a host system and a "balloon" driver loaded into the operating systems of each of a plurality of guest systems that are connected to the host system.

DETAILED DESCRIPTION

The main idea of this invention is a unique way for the host system to allocate a limited resource among different guest systems that are connected to the central, host system and must share the limited resource. According to the invention, a mechanism is included within the guest system that claims (reserves) the resource within the guest, and then makes the claimed resource available to the host system. As is mentioned above, examples of such a resource include CPU time, I/O bandwidth, processors in a multi-processor system, and memory space. Because it will be the most common case, the resource to be managed is assumed below to be the system memory, which, since it is an actual hardware component, may also be referred to as the "machine memory." The concepts and software mechanisms described below apply equally, however, to the management of other resources and any modification, if needed at all, will be obvious to those skilled in the art of software engineering. These concepts and mechanisms are explained in greater detail below.

One concept used in this description of the invention is referred to interchangeably as "paging" or "swapping." As commonly used in the field of computer science, these terms refer to the operation of demand-paged virtual memory systems that move fixed-size units of memory ("pages") between fast memory (for example, RAM) and a slower "backing store" memory (for example, disk).

Main System Components

As FIG. 1 shows, the main components of the system according to the invention include an underlying hardware platform 100, host system software 200, and a plurality of guest systems 300, . . . , 300n. As in most computers, two different types of data storage are provided: a relative fast system memory 230 (the machine memory), typically implemented using any of the various RAM technologies, and a much slower but usually higher-capacity storage device 240 such as one or more memory disks. FIG. 1 also shows that conventional peripheral devices 250 may be connected to run on the hardware 100 via the host system software 200; no particular peripheral devices are required by the invention although some, such as a printer or display, will normally be included at least for administrative purposes.

Host System

In the following discussion, the hardware 100, the host system software 200, system memory 230 and the storage device 240 are referred to collectively as the "host" or "host system," since they make up the key components of the central processing system to which the various guest systems are connected.

Host Hardware

As will become clearer from the description below, this invention does not require any particular hardware platform or memory segmentation scheme. Nonetheless, because it is so common, and by way of example only, it is assumed below that the hardware platform has an x86 architecture (used in the Intel line of microprocessors). As in any x86 system, it is therefore further assumed that memory is divided into, allocated, revoked and locked as pages. Any other minimum memory unit may, however, also be used, and will require little or no modification of the preferred embodiment of the invention described below.

The system hardware 100 includes a central processor 110, which may be a single processor, or two or more cooperating processors in a known multiprocessor arrangement. As in other known systems, the hardware includes, or is connected to, conventional registers, interrupt-handling circuitry, and a memory management unit MMU 120.

Host Software

As in other computer systems, the host system according to the invention includes a host operating system (HOS) 220, which will include drivers 222 as needed for controlling and communicating with the various devices 250 and, usually, for the disk 240 as well. Because this invention does not presuppose any particular host operating system, and because the characteristics and functions of operating systems are so well known, the HOS 220 is not discussed in greater detail, except insofar as it cooperates with the components of the system unique to the invention. One of these unique components is a software module referred to as a resource scheduler 270, which is described separately below.

Guest Systems

The central assumption of the invention is that one or more guest systems wants to use the limited, central resource in the host system, but must share this resource either with the other guest systems, or with the host system itself, or with both. This situation may arise for many different kinds of guest systems.

In the preferred embodiment of the invention, the guests systems 300, . . . , 300n are virtual machines VM1, . . . , VMn. As is well known in the field of computer science, a virtual machine (VM) is a software abstraction—a "virtualization"—of an actual physical computer system. As such, each VM 300 will typically include a virtual CPU 310 (VPROC), a guest operating system 320 (which may simply be a copy of a conventional OS), virtual system memory 330 (VMEM), a virtual disk 340 (VDISK), virtual peripheral devices 350 (VDEVICES) and drivers 322 (VDRIVERS) for handling the virtual devices 350, all of which are implemented in software to emulate the corresponding components of an actual computer. Although the key components of only one guest system 300 are illustrated in FIG. 1 and discussed below, the structure of the other guest systems will be essentially identical.

Of course, most computers are intended to run various applications, and VM's are usually no exception. Consequently, by way of example, FIG. 1 illustrates two applications $360_1$, $360_2$ installed to run at user level on the guest OS 320; any number of applications, including none at all, may be loaded for running on the guest OS, limited only by the requirements of the guest system. If the VM is properly designed, then the applications will not "know" that they are not running directly on "real" hardware. Of course, all of the applications and the components of the virtual machine 300 are instructions and data stored in memory, just as any other software. The design and operation of virtual machines is well known in the field of computer science.

Virtual Machine Monitors

Some interface is usually required between a VM and the underlying host operating system HOS 220 and hardware, which are responsible for actually executing VM-issued instructions and transferring data to and from the actual memory and storage devices 230, 240. This interface is often referred to as a virtual machine monitor (VMM). A VMM is usually a thin piece of software that runs directly on top of a host, or directly on the hardware, and virtualizes all the resources of the machine. The interface exported to the respective VM is the same as the hardware interface of the machine, so that the guest OS cannot determine the presence of the VMM. The VMM also usually tracks and either forwards (to the HOS) or itself schedules and handles all requests by its VM for machine resources as well as various faults and interrupts. The general features of VMM's are known in the art and are therefore not discussed in detail here.

In FIG. 1, VMM's 260 (VMM1), . . . , 260n (VMMn) are shown within the host 200, acting as interfaces for their respective attached VM'a VM1, . . . , VMn. It would also be possible to include each VMM as part of its respective VM, that is, in each guest system. Moreover, it would also be possible to use a single VMM to act as the interface to all VM's, although it will in many cases be more difficult to switch between the different contexts of the various VM's (for example, if different VM's use different virtual operating systems) than it is simply to include a separate VMM for each VM. The important point is simply that some well-defined, known interface should be provided between each guest system 300, . . . , 300n and the host 200. Indeed, if the guests are computers and the host is a server, then virtualization will not be an issue, and no VMM will be needed at all, but will instead be replaced by analogous software modules.

In some conventional systems, a VMM will run directly on the underlying hardware, and will thus act as the "host" operating system for its associated VM. In other systems, the host operating system 220 is interposed as a software layer between VMM's and the hardware, and in still other arrangements are possible. This invention works with all such configurations, the only requirement being that requests by VM's for memory (or whatever shared system resource must be allocated using the invention) should be able to be tracked and scheduled.

Physical, Machine and Virtual Memory

In any given computer system there is a limited amount of memory space (or other resource), that is, space in actual memory circuitry or on actual hardware disks. This is the "machine memory." Note that the host operating system, the drivers 222, the VMM's 260, etc., are also all software constructs, that is "programs," that are stored in the machine memory and should not be overwritten by applications. Some portion of the machine memory is therefore usually reserved for the host system itself, and is thus made "invisible" to applications and to guest systems. Furthermore, the machine memory may be adjustably partitioned so that only certain portions of the machine memory are made available to guest systems. The "physical memory" a virtualized portion of the machine memory that any given guest (in particular, its operating system) is aware of, that is, that lies within the limits of memory made available to it by the host system.

To understand the invention, one should keep in mind that one of the main jobs of an OS is to allocate, deallocate and lock memory for the various applications running on it. It also moves data back and forth between the disk and the system memory. For example, whenever a user of a word processing program opens a document file, the program usually issues a request to the OS to transfer the file from disk to the much faster system memory. On the other hand, other memory-intensive applications may also be running, so there might not be enough system memory available for all of the applications at once. Applications and devices communicate their current need for storage via their respective drivers and/or standardized software interfaces.

In operating systems such as those made by Microsoft, an Applications Program Interface (API) is usually included specifically to act as the interface between the operating system and applications. Other known OS's have either analogous mechanisms, or do not need them at all and allow direct passing of instructions from applications to the OS. Regardless of how applications pass instructions and memory requests to the OS, the OS is responsible for tracking memory portions allocated to each application, and for handling or at least setting up most data transfer between memory, applications and peripheral devices.

Some tasks are more important than others, in the sense that they have a more urgent need for memory. For example, it would not be suitable for a display driver to have to wait for its display data to be retrieved from disk for each display cycle. The OS must then decide which data is to be stored in the system memory and which must be stored on the disk. As system memory again becomes available, the OS may again swap pages from the disk to memory. The decision about when to swap pages to and from disk, and when, will be made according to a policy that is implemented as part of the OS itself. This is well known in the art of OS design.

In the context of virtual machine technology, memory and storage are also virtualized. The guest operating system 320, functioning as if it were running directly on the underlying hardware platform, thus allocates, deallocates and locks virtual memory and disk space for its associated applications $360_1$, $360_2$. Once again, however, all actual storage of data must take place in some hardware device, namely, the memory 230 or the disk 240. In order for each VM to keep track of where data is stored, it therefore preferably maintains a mapping of virtual memory pages to physical memory pages. Similarly, the respective VMM (or some other known software module) maintains a mapping of the physical memory pages to the machine memory pages. At all times it is therefore possible to construct a mapping of virtual memory to machine memory, and vice versa.

"Balloon" Driver and Resource Allocation

The fundamental idea of the invention is that a driver, referred to here as the "balloon driver" 370, is loaded in any conventional manner into each guest OS. The reason for the term "balloon" will become clear later. These drivers (one per guest) are all functionally connected to a system-wide scheduling module—the resource scheduler 270—which is loaded within the host 200. As is explained in greater detail below, the balloon drivers, in cooperation with the resource scheduler, bring about memory page allocation, deallocation, and locking in the guest OS 322.

According to the invention, the resource scheduler instructs the balloon drivers to "inflate" and "deflate," meaning that they increase and decrease, respectively, the number of memory pages they request to be allotted to them by their respective guest OS's. For example, assume that the resource scheduler 270 determines, using any conventionally predetermined and programmed policy, that it needs to take N memory pages, currently allotted to VM1, and make this memory space available to some other VM(s). The resource scheduler 270 then causes VM1's balloon driver 370 to issue a request to its guest OS 320 to allocate it N pages of virtual memory and to lock these pages down, that is, to pin them in physical memory. The balloon driver thus "inflates" by N pages. (The preferred method of communication between the host and the balloon drivers is explained below.)

If there is enough physical memory available to VM1 to satisfy the balloon driver's requests, then the guest OS, using its normal mechanisms, carries out the request and locks down the N memory pages. The additional effect of this, however, is that N pages of physical memory in the guest OS will now also have been reserved by the balloon driver, and the corresponding machine memory can therefore be reclaimed by the resource scheduler 270. This can be accomplished by having the VMM invalidate the "physical page to machine page" mapping for each physical page reserved by the balloon driver, thereby making the machine page available for allocation to another guest OS. In this way, the scheduler can make the N pages available for use by other guest systems.

Note that all the guest OS "knows" is that the balloon driver 370, just like any other device driver, must have N memory pages; there is no information in the guest OS about why the N pages are needed.

On the other hand, if the guest OS 320 does not have enough free physical pages to satisfy the balloon driver's allocation request, then it will be forced to swap at least some memory pages out to its own virtual disk 340 in order to satisfy the balloon driver's request. Even in this case, however, N pages will still be allocated to the balloon driver, and since the only purpose of the balloon driver is to request and relinquish memory pages, these N pages will once again be available to the resource scheduler for allocation to other guest systems.

Now assume that the resource scheduler decides (again, following any conventionally determined policy) that VM1 is to be given more memory. The resource scheduler then tells the respective balloon driver to "deflate," that is, to decrease the number of physical memory pages it requires from the guest OS. The guest OS will then use its own memory management algorithms to reclaim the released pages, which it is then free to use for other applications, such as $360_1$, $360_2$, its virtual devices 350, or simply leave available. From the perspective of the guest OS 320, the entire host system thus appears as a "device" that communicates its need for memory, like any other device, via an installed driver, namely, the balloon driver 370.

Whenever a guest system (VM) connects to the host system 200, the resource scheduler sets up at least one balloon register, for example, an actual processor register, or a dedicated memory location or shared state, or other communication channel, either within the scheduler itself, or within the VMM that handles the VM. The resource scheduler will then store the target balloon size (that is, number of pages to be locked) in the balloon register. The target balloon size, that is, the resource quantity request, may be expressed either as an absolute number of memory pages (or other units) the respective balloon driver should currently be requesting from its guest OS, or the amount of pages by which the driver should inflate or deflate.

There must be some mechanism for communicating between the balloon drivers in the different guest operating systems 320 and the resource scheduler 270, preferably with minimal interference with the normal operation of the system as a whole. The mechanism used successfully in one prototype of the invention is that each balloon driver uses a conventional "backdoor" protocol via a dedicated virtual I/O port. This port is any existing I/O port that is not already used by any guest system. Although this port is a virtualization (where the guest system is a VM), it will still be a logically unique port implementing a separate communications channel.

Whenever the backdoor port is accessed by the balloon driver running in the guest, the VMM recognizes it as a communication from the balloon driver to the monitor—note that all port accesses will be trapped by the VMM monitor, since I/O is a privileged operation. The communication protocol is therefore as follows:

(a) before accessing the backdoor port, the balloon driver sets up register values as arguments to pass to the VMM via the balloon register(s);

(b) the backdoor port is accessed, causing a trap into the VMM;

(c) the VMM reads the arguments out of the register(s) set up by the balloon driver, takes appropriate action, and places any return values (such as status or error code) in the registers used for communication; and (d) control is returned to the driver, which reads the return values out of its registers.

The balloon driver itself has the following preferred structure, expressed in pseudo-code:

```
Balloon driver:
    LOOP
        Request target balloon size by reading balloon register in the
        VMM
        IF (target > current size)
            request and lock down more memory from the guest OS
            confirm and inform VMM of locked page numbers
        IF (target < current size)
            deallocate and unlock memory
            confirm and inform VMM of unlocked page numbers
        Delay (sleep/timeout); this step is optional, that is, delay may be
        set to 0
    END
```

The frequency of execution of the balloon driver loop, and thus of reallocation of memory (adjustment of balloon size), will in general depend on the guest OS. In Microsoft Windows operating systems, the driver may be installed in the guest OS as a separate thread, which will execute periodically in the normal course of execution of the OS itself. In other OS's such as Linux (or even Windows, if preferred), a timer interrupt can be included so as to generate an interrupt and execute the balloon driver loop at some predetermined intervals, for example, once per second. Upon each execution of the driver loop, the balloon driver will access its balloon register, read in its target balloon size, and adjust its demand on the guest OS accordingly. Note that the invention does not require all guest OS's to be the same, so that different updating methods may be used in different VM's. After successful completion of the request, the balloon driver then confirms this and informs the VMM about which physical pages have been allocated/deallocated, so as to enable the VMM to maintain proper mappings.

Different guest operating systems will have different instructions used by drivers to request and release memory. In general, however, there will be some kernel API that drivers use to request memory pages. In Linux OS's, for example, the instructions

```
addr = get_free_page(GFP_ATOMIC)
ppn = (addr - PAGE_OFFSET) >> PAGE_SHIFT
``` will allocate a single memory page and compute the physical pages numbers (PPN). Here, the argument "GFP_ATOMIC" is a priority to the memory allocator and is irrelevant to this invention. Note that if get_free_page( ) fails to allocate memory, then it returns the value zero. The instruction that frees a memory page at address addr is:

free_page(addr)

Microsoft Windows OS's have analogous instructions. For example, the Windows 2000 OS has the following primitive routine to allocate physical memory pages:

mdl=MmAllocatePagesForMdl( . . . , sizeBytes)

where "mdl" is a Windows OS memory descriptor list and sizeBytes, as one would surmise, indicates how much memory is to be allocated. The array of underlying physical pages numbers (PPN's) can be retrieved using the instruction:

ppns=MmGetMdlPfnArray(mdl)

This memory can then be deallocated using the instruction:

MmFreePagesFromMdl(mdl)

Whenever any of these command fails, then the OS either generates an exception or returns some value indicating failure. Such allocation (or deallocation) failures are then detected by the balloon driver. If the balloon driver is unable to allocate more pages, then it may, for example, suspend operation until the next time the balloon driver loop is invoked and executed. This in turn gives the guest OS time to free more physical pages, perhaps by swapping out some pages to disk. During the next loop iteration, the balloon driver may then retry the operation.

Users of the guest systems may choose to load the balloon driver for any of a number of reasons. One reason might be that the administrator of the system as a whole simply requires installation of the balloon drivers by all users who wish to participate in the system. For example, if the guest systems are VM's, then the balloon drivers may be pre-installed in their respective guest OS's. This may also be the case where all guest systems are part of the same enterprise, for example, client systems in an integrated, proprietary computer network in a large corporation, which simply installs the balloon drivers in the connected clients, and the resource scheduler in its central host.

Instead of having the balloon driver loaded within the guest OS as the resource-requesting mechanism, it would also be possible to implement the functions of the balloon driver in a user-level application—a "balloon application"—that runs within the VM on the guest OS. In this case, the balloon application will receive the resource quantity request from the resource scheduler and communicate the corresponding request for memory (or other system resource) to the guest OS using conventional commands and protocols. The balloon driver is preferred, however, not only because of the relatively straightforward, standardized protocols for communication between drivers and an OS, but also because it increases the security of the system by making it harder for user to override or tamper with the ballooning mechanism. Moreover, a balloon driver can also be preinstalled in the guest system OS, leaving the user to choose all of the applications he may want to load in the VM.

Any conventional memory allocation policy may be used by the resource scheduler to decide how much fast system memory each guest is to get relative to other guests. One option that the invention makes possible and easy to implement, however, is that different guest systems may be given different levels of priority depending not only on some predetermined, central policy, but also by "subscription." For example, if a particular user wants greater access to the faster, system memory, then he could pay a higher fee to the central administrator. The resource scheduler can then set the balloon driver in that user's guest to "deflate," and perhaps never to inflate beyond a certain point, which will cause a minimum amount of memory always to be available to that user's guest system.

Adaptive Rate Control

If the resource scheduler, via one of the VMM's, asks the corresponding balloon driver to allocate a large amount of memory, then trying to allocate it all at once could place significant stress on the guest OS, demanding CPU time and disk bandwidth to run its paging/swapping algorithms. To avoid this problem, it would therefore be preferable to inflate/deflate the balloon more gradually to avoid stressing the guest OS. Note that inflation and deflation can be done either one page at a time, but with different rates, or at a constant rate, but with different numbers of pages each time, or a combination of both. The decision about which scheme to use will depend, for example, on the instruction set and/or the kernel programming interface of any given guest OS and the level of complexity needed in each case. The decision and corresponding implementation can be made using normal design considerations.

In one alternative embodiment of the invention, the rate at which memory is allocated or freed by the balloon driver is therefore controlled, preferably adaptively. In the simplest version of this embodiment, the balloon drivers are inflated and deflated at a constant, experimentally predetermined rate. In one prototype of the invention, this rate was roughly one megabyte per second.

In an improved, adaptive version of the invention, the rate of inflation/deflation is limited to fall within a specified minimum and maximum range [min, max]. The operation of this embodiment is as follows:

First, recall that if the guest OS is unable to accommodate the current demands (that is, the requested size of inflation or deflation) of its balloon driver, then it will return or generate some conventional indication of failure, which will be visible to the balloon driver. Initially, set the current inflation/deflation rate used by the resource scheduler for any given balloon driver to a predetermined minimum value min. If the requested allocation is successful, then the resource scheduler increases the rate by some predetermined amount. If the allocation fails, the system then preferably quickly decreases the rate, for example by dividing by some predetermined constant. As the rate is periodically increased and decreased, it will eventually reach or track the maximum permissible rate for each given balloon driver/guest OS. This method thus permits faster balloon inflation and deflation without placing too much stress on the guest OS.

In the preferred embodiment of the invention, the adaptive rate control mechanism is implemented (that is, included as a software module) within each balloon driver itself. The advantage of this is that each balloon driver may then operate autonomously. It would also be possible, however, for the adaptive rate control mechanism to be included within a host software module such as the VMM or resource scheduler, in which case conventional programming techniques should be used to enable exceptions (in the case of allocation failures) to be forwarded to the control mechanism.

Advantages of the Invention

One key advantage of this invention is that it allows each guest OS to decide which particular pages to reclaim: The balloon driver requests a certain number of pages, but the guest OS, using its existing procedures and its own memory management and swapping algorithms, decides which memory pages are to be taken from which other applications or devices. Because the balloon driver according to the invention allows the guest system to use its own native page replacement algorithms (including application-level paging), the behavior of the guest should closely match that of a native system; this further avoids introducing performance anomalies. Moreover, the balloon drivers make this possible while remaining substantially "transparent"—the guest OS has no knowledge of the purpose of the balloon driver, and neither the balloon driver nor the higher-level host/VMM resource scheduler interferes with the native decision-making ability of the guest OS.

Conversely, the balloon driver, especially in the context of virtual machines, does not require any support from the guest systems other than the ability to allocate and free memory pages, which, as is described above, can be accomplished using well-known, standardized protocols. In other words, no explicit "balloon interface" need be exported to the guest OS. The invention therefore does not require any modifications to the guest OS kernel, but rather works even with unmodified commodity operating systems such as Windows 2000.

Another advantage of the ballooning mechanism is that it avoids the problem of redundant paging that is mentioned above—there is no duplication of any memory mapping, since all swapping is performed by the guest.

Drawing once again from the field of economics, one might therefore say that the invention allows for decentralized, local decisions about allocation of the limited resource (here: fast system memory) using the local systems' own resource management mechanisms. This leads to a system that is more efficient and flexible not only for each guest system, but also globally.

I claim:

1. A non-transitory computer-readable storage medium containing program instructions for allocating at least one shared resource of a computer system, wherein execution of the program instructions by one or more processors of the computer system causes the one or more processors to perform steps comprising:

issuing a memory quantity request to a virtual machine, the computer system comprising a host system including a host operating system and a hardware memory, and at least one virtual machine operatively connected as a guest system running on the host system and having a guest operating system operable to address and allocate guest physical memory, wherein the guest physical memory is mapped to various regions of the hardware memory;

executing a memory reservation software module in the virtual machine in response to the memory quantity request;

by the virtual machine, allocating guest physical memory that is assigned to be used by the virtual machine to the memory reservation software module in the virtual machine for reallocation to one or more other virtual machines; and by the host system, assigning a portion of the hardware memory corresponding to the guest physical memory allocated to the memory reservation software module to the one or more other virtual machines, wherein the portion of the hardware memory corresponding to the guest physical memory that is allocated to the memory reservation software module by the guest operating system is made available to the host system for reallocation.

2. The non-transitory computer-readable storage medium according to claim 1, wherein said another resource is another virtual machine.

3. The non-transitory computer-readable storage medium according to claim 1, wherein the amount of guest physical memory allocated to the memory reservation software module is equal to the amount of guest physical memory specified in the memory quantity request.

4. The non-transitory computer-readable storage medium according to claim 3, wherein:

upon an increase in the memory quantity request issued to the virtual machine, the guest operating system of the virtual machine allocates to the memory reservation software module a corresponding quantity of guest physical memory such that the portion of the hardware memory corresponding to the allocated guest physical memory becomes available for allocation by the host system; and upon a decrease in the memory quantity request issued to the virtual machine, the guest operating system releases any prior allocation of a corresponding quantity of guest physical memory such that the portion of the hardware memory corresponding to the released guest physical memory becomes available for use by the virtual machine.

5. The non-transitory computer-readable storage medium according to claim 1, wherein, when the memory reservation software module is executed, the guest operating system changes the amount of the guest physical memory allocated to applications and drivers loaded in the virtual machine and running on the guest operating system.

6. The non-transitory computer-readable storage medium according to claim 1, the steps further comprising:

limiting the rate at which the guest physical memory is allocated to the memory reservation software module to a maximum reservation change rate.

7. The non-transitory computer-readable storage medium according to claim 6, the steps further comprising:

adjusting the maximum reservation change rate.

8. The non-transitory computer-readable storage medium according to claim 1, wherein the host system includes a resource scheduler for allocating the hardware memory, and the memory quantity request is issued by the resource scheduler to a virtual machine.

9. The non-transitory computer-readable storage medium according to claim 1, wherein the virtual machine comprises a virtual processor, virtual system memory, a virtual disk, and virtual peripheral devices and drivers.

10. A computer system comprising:

a computer host system including a host operating system and a physical resource; and a plurality of guest systems operatively connected to the computer host system and having a guest operating system operable to address and allocate a guest resource, wherein the guest resource is mapped to various regions of the physical resource, each of the guest system being configured to: (i) receive a resource request from the host system, and (ii) by that guest system, allocate a guest resource that is assigned to be used by that guest system to a resource reservation software module located within that guest system for reallocation to one or more other guest systems in response to the resource request, wherein the computer host system assigns a portion of the physical resource corresponding to the guest resource allocated to the resource reservation software module of one of the guest systems to the one or more other guest systems.

11. The computer system according to claim 10, wherein the computer host system includes a resource scheduler for allocating the physical resource, and wherein the resource scheduler is configured to communicate with the resource reservation software module of at least one of the guest systems via an existing input/output port that is not already used by any of the guest systems.

12. The computer system according to claim 11, wherein the resource scheduler is configured to use one or more registers to communicate with the resource reservation software module of at least one of the guest systems via the existing input/output port, the one or more registers being used to relay at least one register value to achieve allocation of the guest resource to the resource reservation software module.

13. The computer system according to claim 10, wherein the computer host system includes a resource scheduler for allocating the physical resource, and wherein the resource scheduler is configured to control the amount of the guest resource that is requested by the resource reservation software module of a particular guest system based on a subscription for the particular guest system.

14. The computer system according to claim 13, wherein the resource scheduler is configured to limit the amount of the guest resource that is requested by the resource reservation software module of the particular guest system based on the subscription for the particular guest system.

15. The computer system according to claim 10, wherein at least one of the guest systems includes a guest operating system in which the resource reservation software module is pre-installed.

16. The computer system according to claim 10, wherein at least one of the guest systems comprises a user-level application that includes the resource reservation software module.

17. The computer system according to claim 10, wherein each of the guest systems include a virtual machine and a guest operating system, and wherein the resource reservation software module of each of the guest systems includes a balloon driver for reallocation of the physical resource.

18. The computer system according to claim 17, wherein the computer host system includes a software module to monitor and manage the virtual machines, and wherein the software module communicates with the balloon drivers of the guest systems to control the amount of the guest resource allocated to each of the balloon drivers.

19. A method for allocating at least one shared resource of a computer system, the method comprising:
- issuing a resource quantity request to a guest system from a host system, the computer system comprising the host system including a host operating system and a physical resource, and a plurality of guest systems operatively connected to the host system and having a guest operating system operable to address and allocate a guest resource, wherein the guest resource is mapped to various regions of the physical resource;
- executing a resource reservation software module in the guest system;
- by the guest system, allocating a guest resource that is assigned to be used by the guest system to the resource reservation software module in the guest system for reallocation to one or more other guest systems, the guest resource corresponding to a portion of the physical resource that is made available to the host system for reallocation; and
- by the host system, assigning the portion of the physical resource corresponding to the guest resource allocated to the resource reservation software module to the one or more other guest systems.

20. A non-transitory computer-readable storage medium containing program instructions for allocating at least one shared resource of a computer system, wherein execution of the program instructions by one or more processors of the computer system causes the one or more processors to perform steps comprising:
- issuing a resource quantity request to a guest system from a host system, the computer system comprising the host system including a host operating system and a physical resource, and a plurality of guest systems operatively connected to the host system and having a guest operating system operable to address and allocate a guest resource, wherein the guest resource is mapped to various regions of the physical resource;
- executing a resource reservation software module in the guest system;
- by the guest system, allocating a guest resource that is assigned to be used by the guest system to the resource reservation software module in the guest system for reallocation to one or more other guest systems,
- the guest resource corresponding to a portion of the physical resource that is made available to the host system for reallocation; and
- by the host system, assigning the portion of the physical resource corresponding to the guest resource allocated to the resource reservation software module to the one or more other guest systems.

* * * * *